Nov. 29, 1960  F. H. SHEPARD, JR  2,962,711
SUPERREGENERATIVE RADIO RANGE FINDER
Filed March 6, 1953
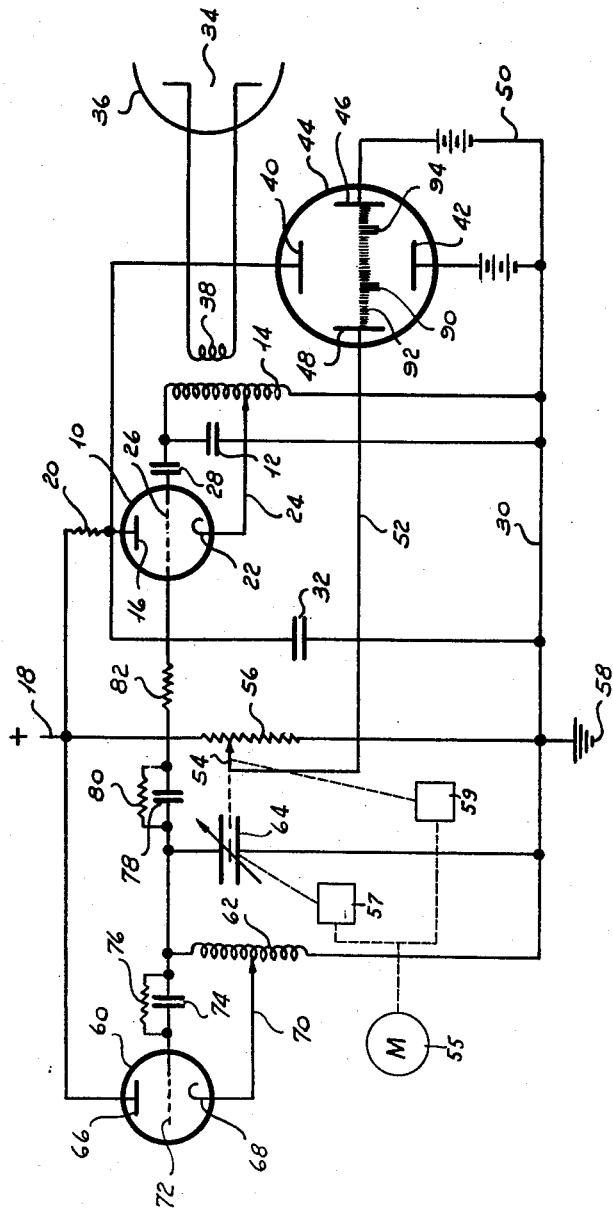
INVENTOR.
FRANCIS H. SHEPARD JR.
BY
ATTORNEY

United States Patent Office 2,962,711
Patented Nov. 29, 1960

2,962,711

SUPERREGENERATIVE RADIO RANGE FINDER

Francis H. Shepard, Jr., 27 Norman Circle, Madison, N.J.

Filed Mar. 6, 1953, Ser. No. 340,745

6 Claims. (Cl. 343—13)

My invention relates to a superregenerative radio range finder and more particularly to a range finder of simple construction which is inexpensive to manufacture.

In conventional radio range finding systems known as "radar" the time between the transmitted pulse and the reception of a reflected echo from the target against which the transmitted pulse impinges is measured. This time is directly proportional to the total distance traversed by the radio wave from the transmitting antenna to the target and back to the antenna. In conventional radar systems a high-powered transmitter is pulsed whereby a short, powerful burst of electromagnetic energy is emitted at the target and is narrowly beamed in a given known direction. The returning echo from the target is received, detected and usually visually displayed. The pulse repetition rate must be slow enough to allow time for the maximum range echo to return to the antenna before another pulse is transmitted and must be fast enough to provide enough tracers while the antenna is rotating or pointing in a given direction to produce a lasting indication on an oscilloscope screen. The receiver is arranged so that it is rendered operative immediately after the transmitted pulse has subsided so that the echo or reflected radio frequency energy may be detected. There are numerous elaborate means for measuring this elapsed time between emitted and received pulses to obtain the range to the target.

A conventional radar system has a plurality of complex components including the transmitter, the synchronizer, the receiver and an antenna system which includes a transmit-receive switch to prevent the transmitter energy from harming the receiver.

One object of my invention is to provide a radio range finder which will greatly simplify the means for transmitting and receiving pulses.

Another object of my invention is to provide a radio range finder which may employ a minimum of only two thermionic tubes.

Another object of my invention is to provide a radio range finder in which the transmitting oscillator acts as a superregenerative receiver so that the same tube will simultaneously perform the function of the transmitter and the receiver.

Another object of my invention is to provide a superregenerative radio range finder in which the superregenerative oscillator is operated in the logarithmic mode.

Another object of my invention is to provide a radio range finder employing a superregenerative receiver in which the noise factor is quite low and comparable with the noise factors of other types of radio receivers.

Other and further objects of my invention will appear from the following description.

In general, my invention contemplates the provision of an oscillator adapted to transmit the radio pulses which are to be reflected from an object whose range is to be measured. I control the enabling of the oscillator by a second oscillator and vary the enabling of the first oscillator after each transmitted pulse by varying the frequency of the control oscillator. If the frequency of the control oscillator is $f$, the interpulse time will be $1/f$. If the carrier oscillator is enabled at the very instant a reflection is received from a target the carrier oscillator will start to build up from a large initial amplitude and hence the time to reach a saturated amplitude of oscillations in the carrier oscillator will be greatly decreased. Means are provided for viewing the effective integrated amplitude of oscillations. The increase in the amplitude of oscillations will represent a return and the position of the spot of the increase of oscillations will represent the range since there is a definite spot on the oscilloscope for a definite range.

In the accompanying drawing, which forms part of the instant specification, the figure represents a diagrammatic view of a circuit of a superregenerative radio range finder showing one embodiment of my invention.

A superregenerative system is one in which the circuit is alternately made oscillatory and nonoscillatory at a predetermined radio frequency rate. A superregenerative receiver is capable of tremendous amplification and a one-tube superregenerative detector may easily reach the thermal-agitation noise level of a tuned input circuit. There are three modes of operation in superregeneration, namely, the separate quenching of the oscillator in the logarithmic mode, the separate quenching of the oscillator in the linear mode, and by use of a self-quenching oscillator. In separately quenched systems, an oscillator operating at radio frequency alternately allows oscillations to build up in the regenerative circuit and then causes them to die out or be quenched. In the logarithmic mode, the operating conditions are so chosen that the oscillations are able to build up to an equilibrium value before being quenched. In absence of a signal, thermal-agitation noises in the input circuit produce the initiating voltage which starts the build-up process. When, however, an incoming signal is present, represented in the instant invention by a reflection from a target, this signal provides the initiating pulse for the build-up period and causes the equilibrium to be reached sooner than when the incoming signal is not present, that is, when the initiating pulse is smaller. This causes the area under the envelope of the oscillations to increase in direction proportional to the logarithm of the elapsed time after the oscillator is enabled. The thermionic tube, which is connected in the oscillator circuit, is essentially a negative resistance placed across a tuned or tank circuit. If the negative resistance across the tuned circuit is lower than the negative resistance of the circuit, oscillations will start to build up until saturation is reached. If we plot on logarithmic paper the amplitude of oscillation from the time the oscillator is enabled until it saturates, we will see that the rate of build-up on logarithmic paper is linear between noise level and saturation. The rate of build-up is a function of the difference between the resistance of the oscillator tube and the resistance of the tank circuit. If the negative resistance of the thermionic oscillator tube is slightly less than that of the tank circuit, the rate of build-up will be slow. If the negative resistance of the oscillator tube is much less than that of the tank circuit, the build-up will be much greater and the initial noise level will be higher. The selectivity or band width of the receiver is proportional to the build-up rate.

In the linear mode the oscillator is quenched before saturation. The quenching frequency is so chosen in relationship to the circuit constants that the oscillations are not able to build up to equilibrium value before being quenched. In the linear mode of operation the incoming signal causes the starting level of the build-up period to be increased by an amount dependent upon the amplitude of the incoming signal, as is the case in the logarithmic mode. However, the higher starting level also causes, in the linear mode, the maximum amplitude reached before quenching to be greater and directly proportional to the signal.

It will thus be seen that if the oscillator is disabled before saturation is reached (linear mode) the maximum value of the output will be limited. If the voltage level in the tank circuit is at noise level, the output will build up to a predetermined voltage. If the voltage level of the incoming signal is, for example, ten times the noise level at the instant the oscillator is enabled, then the voltage reached when the oscillator is quenched will be ten times as great, provided saturation has not been reached. If the oscillator is enabled for a limited period of time repetitively, the peak amplitude of the output of the oscillator in volts will be directly proportional to the radio-frequency level in the tank circuit in microvolts at the time the oscillator is enabled. In this manner a simple oscillator periodically enabled acts as a high-gain radio-frequency amplifier the maximum gain of which is the gain necessary to bring the noise level up to saturation. If the negative resistance of the oscillator is only slightly less than the resistance of the tank circuit, the rate of build-up, as pointed out above, will be slow. The cycles of the radio-frequency oscillations in the tank circuit will then cumulatively add their energy to that of the oscillator. If the oscillator is not tuned to the exact frequency of the initial radio-frequency energy in the tank circuit the signal will become out of phase with the oscillator before any susbstantial increase in the oscillator amplitude is caused by the signal. Thus, the integrated energy from the signal will be negligible when the oscillator frequency and the signal frequency are out of phase. If, however, the negative resistance of the oscillator is much less than the resistance of the tank circuit, the rate of build-up of the oscillator will be rapid and the oscillations will have reached a large amplitude before the signal reaches 180° out of phase with the oscillator, and the effect of a slight difference in frequency will be negligible. In other words, the band width of a superregenerative receiver is directly proportional to the rate of rise of the oscillation amplitude, or, stated differently, the band width is directly proportional to the reciprocal of the sum of the positive and negative resistances of the tank circuit and the tube. It will be seen that the band width of a superregenerative receiver can be made quite wide by using a large feedback in the oscillator circuit and employing short, enabling pulses. Conversely, the band width can be made narrower by using lesser amounts of feedback and longer enabling pulses. In this connection it is interesting to note that the initial noise level will vary as a function of the square root of the band width.

In the conventional use of superregenerative receivers for communication purposes it has become generally accepted that the inherent noise level of such a receiver is many times the noise level of receivers of other types. This is in part owing to the fact that the enabling repetition rate, or quench frequency, must be high compared to the intelligence frequency it is desired to handle. This requires a rapid build-up of oscillations and a wide selectivity band width. In the conventional superregenerative receiver the selectivity band width may be twenty-five times that of the intelligence band width. Since the noise factor is proportional to the square root of the selectivity band width, the noise level in a superregenerative receiver will be five times as great as that in a conventional receiver such as a superheterodyne receiver or a tuned radio frequency receiver.

In the instant invention I employ smaller amounts of feedback and longer enabling pulses and thus reduce the band width. I propose to enable the oscillator at the instant a short pulse of reflected energy is received. If this pulse were one microsecond in duration, for example, the rate of oscillator amplitude build-up is so set that within the duration of this pulse, oscillator amplitudes will have reached a level well above the noise level. In other words, the selectivity band width and the intelligence band width may, in my invention, be the same. Accordingly, I am enabled to employ a superregenerative receiver so that its noise factor is comparable to the noise factors of other types of radio receivers.

Referring now to the drawing, the thermionic tube 10 is connected in an oscillator circuit in which the capacitor 12 and the inductance 14 comprise the tank circuit the tuning of which determines the frequency of oscillations. The plate 16 of the tube 10 is connected to a source of positive potential 18 through a current limiting resistor 20. The cathode 22 is connected by conductor 24 to an intermediate point of the inductance 14. The grid 26 of the tube 10 is connected by capacitor 28 to one end of the terminal of the tank circuit. The other terminal of the tank circuit is connected through ground conductor 30 and capacitor 32 to the plate 16. A transmitting antenna 34 and a reflector 36 of any appropriate construction are adapted to radiate radio frequency oscillations generated by the tube 10 and its associated circuit and is coupled to the oscillating circuit by a secondary transformer coil 38 which is inductively coupled to the inductance 14 of the tank circuit, as can readily be seen by reference to the drawing. The D.C. output of the tube 10 is adapted to be impressed across the elements 40 and 42 of a cathode-ray tube 44 of any suitable design, such as an A-scope. This output will indicate in a vertical direction the integrated direct current and hence the amplitude of the oscillations of the oscillator 10. It will be appreciated that the D.C. output of tube 10 may properly be termed a demodulated output since it contains only the energy under the envelope of the radio frequency pulses generated in the tank circuit of oscillator 10. The lateral elements 46 and 48 of the display tube 44 are adapted to shift the spot horizontally in accordance with range. The control of the spot position is accomplished by the voltage impressed across the elements 48 and 46. Elements 42 and 46 are connected by respective batteries to a conductor 50 which is connected to ground 58. Element 48 is connected by conductor 52 through an adjustable arm 54 to a potentiometer resistor 56 connected across the positive supply voltage 18 and ground 58.

A second thermionic tube 60 is connected as an oscillator by a circuit. The frequency of oscillations of this oscillator is determined by its tank circuit, which includes the inductance 62 and a capacitor 64. The capacitor 64 is variable so that the frequency of oscillation of the oscillator including the tube 60 can be varied. The tube 60 has its plate 66 connected to the positive potential 18. The cathode 68 of the tube 60 is connected by conductor 70 to a point in the inductance 62. The grid 72 of the tube 60 is connected to the tank circuit through a capacitor 74, which is shunted by a grid leak resistor 76. A blocking capacitor 78 provided with a shunting resistor 80 places the grid 72 in electrical communication with the grid 26 of the tube 10 through a filtering resistor 82. It will be seen that the tube 60 thus connected as an oscillator will impress a signal upon the grid 26. When this signal is of negative potential, the tube 10 will be quenched. Whenever this signal becomes sufficiently positive the tube 10 will be enabled. The variable capacitor 64, which controls the frequency of the lower frequency oscillator 60, is mechanically coupled to the variable arm 54 of the potentiometer 56. The frequency of the oscillator 60 determines the repetition rate. If this frequency is one megacycle per second, for example, the interpulse time will be one microsecond. In a radar system distance is ascertained by the following formula:

$$d = c \times \frac{T}{2}$$

where $c$ is the velocity of light and T is the time elapsing from the beginning of the transmitted pulse to the beginning of the received echo. If the interpulse time is varied until it is equal to T, then the time of the arrival of the reflected pulse will coincide with the time the oscillator 10 is enabled. Accordingly, this oscillator will reach saturation earlier than it otherwise would, because of the effect of the incoming signal in the form of the reflected pulse. If the inter-pulse time is not such that it is equal to T, then the reflected pulse will not coincide with the enabling of the oscillator and the increased build-up will not be evidenced.

It will be observed, therefore, that if we are to measure the distance to a target in accordance with my invention, all we need do is to vary the frequency of the oscillator 60 so as to vary the interpulse time at which the oscillator 10 is enabled. When we arrive at a frequency for the oscillator 60 such that a reflected pulse will coincide with the enabling of the oscillator, we can measure distance to the target which caused the pulse to be reflected by the frequency at which the oscillator 60 was adjusted to cause this coincidence. Simply stated, I enable the oscillator 10 repetitively at successively different intervals so that all possible times representing the range to be examined between the transmitted and received impulses may be explored. The complete cycle of exploration is accomplished at a repetition rate low compared with the pulse repetition rate. In this manner, the range limit being explored is examined by means of a plurality of pulses at selected intervals along the range limit, each of the pulses representing a definite range. I may oscillate the variable capacitor between two limiting capacities which will give frequencies corresponding to the range being explored by means of a motor 55 driving the variable capacitor through a mechanism of any suitable type known to the art for converting rotary motion to oscillatory motion and concomitantly reciprocate the brushes 54 of the potentiometer resistor 56 in synchronism with the variation of the capacitor 64 by a mechanism 59 of any suitable type known to the art, driven by motor 55 for converting rotary motion to reciprocating motion. The arrangement of parts is such that each definite potential will position the cathode ray between the elements 46 and 48 at a point corresponding to range. If a target is located at 7800 yards, a build-up in the amplitude of oscillations of the oscillator will be evidenced by a bulge 90 upon the face of the oscilloscope 44. This bulge will be below the "grass" 92, which is the amplitude of the oscillations of the oscillator 10 when not built up by an incoming signal. Thus, in exploring the range, the scope may show a second bulge 94 showing another target at a different range. The values of the capacitor 64 and the potential across elements 48 and 46 are suitably calibrated to represent any desired range at any appropriate scale, as will be well understood by those skilled in the art. It will also be understood by those skilled in the art that the frequency of oscillations in the tank circuit of oscillator 60 may be varied by changing the inductance 62 instead of the capacitor 64. The coincidence of the reflected or echo signal with the enabling of the oscillator will cause the amplitude of oscillations of the oscillator 10 to build up to produce the "pip" on the cathode-ray tube 44. For a given time interval a comparatively small absolute increase in the initial signal at the beginning of a cycle occasioned by the reception of the echo at this time will produce a comparatively large absolute signal increase in the output of the oscillator at the end of the cycle, in the manner pointed out above. The total area under the voltage time curve is a logarithmic function of the initial voltage in the logarithmic mode of operation of the superregenerative receiver which I employ in the instant invention.

In a typical case, the components may be calibrated to cover a range of, say 500 yards to 30,000 yards. The enabling oscillator 60 is constantly varied over the range to be examined at any desired rate. Since a distance of approximately 93,000 miles can be examined in one second, neglecting the pulse duration times, a large number of discrete comparatively small distances can be examined in a minute period of time. The antenna 34 may be held stationary in the direction to be examined and the oscillator 10 will thus be enabled in this direction at varying times after each transmitted pulse due to the variation of the frequency of the enabling oscillator 60. If there are any targets between the range limits in the direction being examined, they will show on the oscilloscope tube as "pips" located at points agreeable to their range. After a given direction is examined the antenna may be shifted to examine another direction. If desired, the antenna may be constantly rotated at a comparatively small angular rate to examine a given sector or the complete azimuth, as is well understood by those skilled in the radio range finding art.

It will be seen that I have accomplished the objects of my invention. I have provided a radio range finder with greatly simplified means for transmitting and receiving pulses and which may employ a minimum of only two thermionic tubes. I have provided a radio range finder in which the transmitting oscillator is at once a superregenerative receiver whereby a single tube simultaneously performs the functions of transmitter and receiver. I have provided a radio range finder employing a superregenerative receiver in which the noise factor is quite low and comparable to the noise factors of other types of radio receivers.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A superregenerative radio range finder including in combination a first vacuum tube oscillator, a second vacuum tube oscillator, means for controlling the first oscillator by the output of the second oscillator whereby periodically to enable the first oscillator at the frequency of oscillations generated by the second oscillator, said first oscillator producing a demodulated output at the plate thereof, a directive antenna, means for coupling the antenna to the first oscillator whereby the radio frequency energy of the first oscillator will be transmitted by the antenna and reflected radio frequency energy received by the antenna will pass to the first oscillator, a cathode-ray display tube having two pairs of deflection plates, means for impressing the demodulated output of the first oscillator across one pair of deflection plates, means for impressing a deflection voltage across the other pair of deflection plates, means for simultaneously varying the frequency of oscillation of the second oscillator and said deflection voltage and means for regulating the frequency of oscillation of said second oscillator to permit the oscillations in said first oscillator to build up to equilibrium.

2. A superregenerative radio range finder as in claim 1 in which said first oscillator has a tank circuit comprising an inductance and a capacitance connected in an oscillating circuit, said vacuum tube of said first oscillator being provided with a plate, a grid and a cathode, means for connecting a point intermediate the ends of the tank circuit to said cathode, means for connecting one end of said tank circuit to said grid, means for connecting the other end of said tank circuit to said plate, said means for coupling the antenna to the first oscillator including an inductive coupling with the inductance of said tank circuit.

3. A superregenerative radio range finder as in claim 1 in which the vacuum tube of said first oscillator is provided with an anode and an anode resistor, a capacitor connected between said anode and ground for by-passing radio frequency energy to ground and said means for impressing the demodulated output of the first oscillator across one pair of deflection plates includes a conductor between said anode and one of said deflection plates.

4. A superregenerative radio range finder as in claim 1 in which said second oscillator is provided with a tank circuit formed of an inductance and a capacitance connected in an oscillating circuit and said means for varying the frequency of oscillation of the second oscillator includes means for varying the capacitance of said tank circuit.

5. A superregenerative radio range finder including in combination a first vacuum tube oscillator comprising a feed back circuit, a second vacuum tube oscillator, means for controlling the first oscillator by the output of the second oscillator whereby periodically to enable the first oscillator at the frequency of oscillations generated by the second oscillator, said first oscillator producing a demodulated output at the plate thereof, a directive antenna, means for coupling the antenna to the first oscillator whereby the radio frequency energy of the first oscillator will be transmitted by the antenna and reflected radio frequency energy received by the antenna will pass to the first oscillator, a cathode-ray display tube having two pairs of deflection plates, means for impressing the demodulated output of the first oscillator across one pair of deflection plates, means for impressing a deflection voltage across the other pair of deflection plates, means for simultaneously varying the frequency of oscillation of the second oscillator and said deflection voltage, the feedback provided by the feedback circuit of said first oscillator being small, and means for regulating the frequency of oscillation of said second oscillator to permit the oscillations of the first oscillator to build up to equilibrium whereby to reduce the bandwidth and noise factor of said first oscillator.

6. A superregenerative radio range finder including in combination a first oscillator, a second oscillator having a tank circuit including a variable reactance, means for controlling the first oscillator by the output of the second oscillator whereby periodically to enable the first oscillator at the frequency of oscillations generated by the second oscillator, said first oscillator producing a demodulated output at the plate thereof, a directive antenna, means for coupling the antenna to the first oscillator whereby the radio-frequency energy of the first oscillator will be transmitted by the antenna and reflected radio-frequency energy received by the antenna will pass to the first oscillator, a cathode-ray display tube having two pairs of deflection plates, means for impressing the demodulated output of the first oscillator across one pair of deflection plates, means including a variable impedance for generating a deflection voltage, means for impressing said deflection voltage across the other pair of deflection plates, means for simultaneously actuating said variable reactance and said variable impedance to vary the frequency of oscillation of the second oscillator and the magnitude of the said deflection voltage and means for regulating the frequency of oscillation of the second oscillator to permit the oscillations of the first oscillator to build up to equilibrium.

References Cited in the file of this patent

UNITED STATES PATENTS

| | | |
|---|---|---|
| 2,428,424 | Landon | Oct. 7, 1947 |
| 2,532,221 | Bradley | Nov. 28, 1950 |
| 2,617,020 | Wood | Nov. 4, 1952 |
| 2,625,650 | Spencer | Jan. 13, 1953 |
| 2,644,081 | Richman | June 30, 1953 |

FOREIGN PATENTS

| | | |
|---|---|---|
| 581,168 | Great Britain | Oct. 3, 1946 |
| 264,650 | Switzerland | Feb. 1, 1950 |
| 657,328 | Great Britain | Sept. 19, 1951 |